US012595367B2

(12) United States Patent
Reimann et al.

(10) Patent No.: US 12,595,367 B2
(45) Date of Patent: Apr. 7, 2026

(54) POLYURETHANE COMPOSITION WITH GOOD ADHESION TO PLASTICS

(71) Applicant: SIKA TECHNOLOGY AG, Baar (CH)

(72) Inventors: Sven Reimann, Zürich (CH); Marc Balmer, Unterengstringen (CH); Melanie Jenni, Spreitenbach (CH)

(73) Assignee: SIKA TECHNOLOGY AG, Baar (CH)

( * ) Notice: Subject to any disclaimer, the term of this patent is extended or adjusted under 35 U.S.C. 154(b) by 843 days.

(21) Appl. No.: 17/791,265

(22) PCT Filed: Jan. 11, 2021

(86) PCT No.: PCT/EP2021/050373
§ 371 (c)(1),
(2) Date: Jul. 7, 2022

(87) PCT Pub. No.: WO2021/156016
PCT Pub. Date: Aug. 12, 2021

(65) Prior Publication Data
US 2023/0049786 A1     Feb. 16, 2023

(30) Foreign Application Priority Data
Feb. 3, 2020     (EP) ..................................... 20155195

(51) Int. Cl.
| | |
|---|---|
| *C08L 75/08* | (2006.01) |
| *B32B 7/12* | (2006.01) |
| *B32B 27/08* | (2006.01) |
| *B32B 27/30* | (2006.01) |
| *B32B 27/32* | (2006.01) |
| *B32B 27/34* | (2006.01) |
| *B32B 27/36* | (2006.01) |
| *B32B 27/38* | (2006.01) |
| *B32B 27/40* | (2006.01) |
| *C09D 175/08* | (2006.01) |

(52) U.S. Cl.
CPC .............. *C08L 75/08* (2013.01); *B32B 27/08* (2013.01); *B32B 27/302* (2013.01); *B32B 27/304* (2013.01); *B32B 27/32* (2013.01); *B32B 27/34* (2013.01); *B32B 27/36* (2013.01); *B32B 27/365* (2013.01); *B32B 27/38* (2013.01); *B32B 27/40* (2013.01); *C09D 175/08* (2013.01); *B32B 7/12* (2013.01); *B32B 2270/00* (2013.01)

(58) Field of Classification Search
None
See application file for complete search history.

(56) References Cited

U.S. PATENT DOCUMENTS

| | | | |
|---|---|---|---|
| 5,288,797 A | 2/1994 | Khalil et al. | |
| 5,744,543 A | 4/1998 | Huver et al. | |
| 6,884,904 B2 | 4/2005 | Smith et al. | |
| 8,747,602 B2 | 6/2014 | Rosenberg et al. | |
| 2010/0255314 A1 | 10/2010 | Burckhardt | |
| 2019/0367663 A1* | 12/2019 | Schlumpf .......... C08G 18/4837 |

FOREIGN PATENT DOCUMENTS

| | | |
|---|---|---|
| JP | H03-140364 A | 6/1991 |
| JP | H10-176028 A | 6/1998 |
| JP | H11-335650 A | 12/1999 |
| JP | 2011-503143 A | 1/2011 |
| WO | 2006/123586 A1 | 11/2006 |
| WO | 2009/070293 A1 | 6/2009 |
| WO | 2017/056903 A1 | 4/2017 |
| WO | 2018/234267 A1 | 12/2018 |

OTHER PUBLICATIONS

Apr. 16, 2021 International Search Report issued in International Patent Application No. PCT/EP2021/050373.
Apr. 16, 2021 Written Opinion issued in International Patent Application No. PCT/EP2021/050373.

* cited by examiner

*Primary Examiner* — Jeffrey D Washville
(74) *Attorney, Agent, or Firm* — Oliff PLC

(57) ABSTRACT

A moisture-curing polyurethane composition including (i) at least one linear polymer P1 containing isocyanate groups and having an NCO content in range from 0.3%-3.3% by weight, obtained from reaction of at least one monomeric aromatic diisocyanate and polyether diol having an OH number in range from 5-37 mg KOH/g, (ii) at least one branched polymer P2 containing isocyanate groups and having an NCO content in range from 1%-10% by weight, obtained from reaction of at least one monomeric aromatic diisocyanate and at least one polyether triol having an average OH functionality of at least 2.2 and OH number in range from 16-380 mg KOH/g, (iii) and a content of plasticizers of not more than 15% by weight, based on overall composition, wherein polymers P1 and P2 are present in weight ratio in range from 80/20-95/5, and to the use of composition as elastic adhesive or elastic sealant or elastic coating.

14 Claims, No Drawings

POLYURETHANE COMPOSITION WITH GOOD ADHESION TO PLASTICS

TECHNICAL FIELD

The invention relates to moisture-curing polyurethane compositions having good adhesion to plastic substrates, and to the use thereof as elastic adhesives.

STATE OF THE ART

Polyurethane compositions which crosslink through reaction of isocyanate groups with moisture or water and cure to give elastomers are especially used as elastic adhesives or sealants in the construction and manufacturing industry, for example for bonding of components in assembly or for filling joints. Owing to their adhesion and elasticity, they can gently damp and buffer forces acting on the substrates, triggered for instance by vibrations or variations in temperature. Plasticizers here support high flexibility, but are disadvantageous for the development of good adhesion to plastic substrates.

Polyurethane compositions contain polymers containing isocyanate groups as binders, which are prepared by reacting polyols with monomeric diisocyanates. The polymers thus obtained, on account of chain extension reactions, contain a residual monomeric diisocyanate content, typically in the range from 1% to 3% by weight. Monomeric diisocyanates are potentially harmful to health. Formulations containing monomeric diisocyanates, in particular above a concentration of 0.1% by weight, must be provided with hazard symbols and warning messages on the label and in the data sheets, and in some countries may be subject to regulations in respect of sale and use. There is therefore an interest in polyurethane compositions having a low content of monomers, especially below 0.1% by weight. An attractive route to polymers containing isocyanate groups that have a low monomeric diisocyanate content is to use the monomeric diisocyanate in excess in the preparation of the polymer and then to remove a majority of the unconverted monomeric diisocyanate by means of distillation. This route is particularly easy to implement with monomeric diisocyanates that are of low molecular weight and hence volatile, for example hexane diisocyanate. However, polymers based thereon result in slow curing and low mechanical strength in the products. Polymers based on diphenylmethane 4,4'-diisocyanate (4,4'-MDI) enable rapid, reliable curing and high strength coupled with high elasticity. In the distillative removal of the monomeric diisocyanate, however, production is much more demanding on account of the low volatility of 4,4'-MDI.

Elastic adhesives for the bonding of plastic substrates are increasingly being demanded in industry, for example for the bonding of headlamp housings or panorama roofs in vehicles, organic glass in ships or trains, or various components of caravans. The adhesive here is to cure rapidly and reliably, is to be very elastic while having high strength, and is to have a high bond strength without complex pretreatment on the plastic substrate, even under heat and water stress. Adhesives based on polymers having a low monomer level, however, especially also on account of the substantial lack of monomeric diisocyanates, show weaknesses in the buildup of adhesion to plastic substrates.

SUMMARY OF THE INVENTION

It is therefore an object of the present invention to provide a moisture-curing polyurethane composition that cures rapidly and reliably and builds up good adhesion to plastic substrates coupled with high extensibility and strength, even in the case of a low content of monomeric diisocyanates.

This object is achieved by a composition as described in claim 1. It contains a combination of a linear long-chain polymer P1 and a branched polymer P2 in a weight ratio in the range from 80/20 to 95/5, and a content of plasticizers of not more than 15% by weight. Surprisingly, the composition in the inventive weight ratio between polymer P1 and P2 shows excellent adhesion to substrates, especially polycarbonate, even after heat and water stress. Corresponding compositions having a higher proportion of branched polymer P2 show distinctly poorer adhesion, whereas, in the case of an even lower content of branched polymer P2, the tensile strength of the cured composition significantly decreases abruptly and is inadequate. What is particularly surprising about the composition of the invention is the fact that, in spite of a low content of branched polymer P2 and even in the case of an extremely low diisocyanate monomer content, the result is products having high strength (tensile strength and modulus of elasticity).

The composition of the invention enables elastic adhesives having good storage stability with exclusion of moisture, long open time coupled with rapid curing and high elongation, surprisingly high strength and surprisingly good adhesion to plastic substrates, even with an attractive EHS classification.

Further aspects of the invention are the subject of further independent claims.

Particularly preferred embodiments of the invention are the subject of the dependent claims.

Ways of Executing the Invention

The invention provides a moisture-curing polyurethane composition comprising (i) at least one linear polymer P1 containing isocyanate groups and having an NCO content in the range from 0.3% to 3.3% by weight, obtained from the reaction of at least one monomeric aromatic diisocyanate and a polyether diol having an OH number in the range from 5 to 37 mg KOH/g, (ii) at least one branched polymer P2 containing isocyanate groups and having an NCO content in the range from 1% to 10% by weight, obtained from the reaction of at least one monomeric aromatic diisocyanate and at least one polyether triol having an average OH functionality of at least 2.2 and an OH number in the range from 16 to 380 mg KOH/g, (iii) and a content of plasticizers of not more than 15% by weight, based on the overall composition, characterized in that polymer P1 and polymer P2 are present in a weight ratio in the range from 80/20 to 95/5.

"Monomeric diisocyanate" refers to an organic compound having two isocyanate groups separated by a divalent hydrocarbyl radical having 4 to 15 carbon atoms.

An "aromatic" isocyanate group refers to one bonded directly to an aromatic carbon atom. Isocyanates having exclusively aromatic isocyanate groups are correspondingly referred to as "aromatic isocyanates".

An "aliphatic" isocyanate group refers to one bonded directly to an aliphatic or cycloaliphatic carbon atom. Isocyanates having exclusively aliphatic isocyanate groups are correspondingly referred to as "aliphatic isocyanates".

A "monomeric aromatic diisocyanate" refers to a monomeric diisocyanate having aromatic isocyanate groups.

"NCO content" refers to the content of isocyanate groups in % by weight.

A "plasticizer" refers to a substance which is liquid at room temperature and remains unchanged in the composition after curing thereof and plasticizes the cured composition.

"Molecular weight" refers to the molar mass (in grams per mole) of a molecule or a molecule residue. "Average molecular weight" refers to the number-average molecular weight ($M_n$) of a polydisperse mixture of oligomeric or polymeric molecules or molecule residues. It is determined by gel-permeation chromatography (GPC) against polystyrene as standard.

A substance or composition is referred to as "storage-stable" or "storable" when it can be stored at room temperature in a suitable container for a prolonged period, typically for at least 3 months, preferably up to 6 months or longer, without this storage resulting in any change in its application or use properties to an extent relevant to its use.

"Plastic" refers to an organic material based on macromolecules.

"Room temperature" refers to a temperature of 23° C.

All industry standards and norms mentioned in this document relate to the versions valid at the date of first filing.

Percentages by weight (% by weight), abbreviated to wt %, refer to proportions by mass of a constituent of a composition or a molecule, based on the overall composition or the overall molecule, unless stated otherwise. The terms "mass" and "weight" are used synonymously in the present document.

The polymer P1 preferably has an NCO content in the range from 0.5% to 2.6% by weight, especially 0.7% to 2.0% by weight, more preferably 0.9% to 2.0% by weight.

A suitable monomeric aromatic diisocyanate is especially diphenylmethane 4,4'-diisocyanate, optionally with fractions of diphenylmethane 2,4'- and/or 2,2'-diisocyanate (MDI), tolylene 2,4-diisocyanate or mixtures thereof with tolylene 2,6-diisocyanate (TDI), phenylene 1,4-diisocyanate (PDI), 2,3,5,6-tetramethyl-1,4-diisocyanatobenzene, naphthalene 1,5-diisocyanate (NDI) or 3,3'-dimethyl-4,4'-diisocyanatodiphenyl (TODI).

Among these, preference is given to diphenylmethane 4,4'-diisocyanate or tolylene 2,4-diisocyanate or phenylene 1,4-diisocyanate.

A particularly preferred monomeric aromatic diisocyanate is diphenylmethane 4,4'-diisocyanate (4,4'-MDI). This 4,4'-MDI is of a quality that contains only small fractions of diphenylmethane 2,4'- and/or 2,2'-diisocyanate and is solid at room temperature. It enables polyurethane compositions having particularly rapid curing and particularly high strength coupled with high extensibility and elasticity.

The 4,4'-MDI has preferably been distilled and has a purity of at least 95%, especially at least 97.5%.

A commercially available diphenylmethane 4,4'-diisocyanate of this quality is, for example, Desmodur® 44 MC (from Covestro) or Lupranat® MRS or ME (from BASF) or Suprasec® 1400 (from Huntsman).

The polyether diol preferably contains repeat units selected from the group consisting of 1,2-ethyleneoxy, 1,2-propyleneoxy, 1,3-propyleneoxy, 1,2-butyleneoxy and 1,4-butyleneoxy. Preference is given to 1,2-propyleneoxy groups, with or without a certain proportion of 1,2-ethyleneoxy groups.

More particularly, the polyether diol contains 80% to 100% by weight of 1,2-propyleneoxy groups and 0% to 20% by weight of 1,2-ethyleneoxy groups.

If the polyether diol contains 1,2-ethyleneoxy groups, the 1,2-propyleneoxy groups and the 1,2-ethyleneoxy groups each preferably form homogeneous blocks, and the poly(1,2-ethyleneoxy) blocks are at the chain ends.

The polyether diol preferably has an OH number in the range from 6 to 33 mg KOH/g, particularly 9 to 30 mg KOH/g, especially 12 to 30 mg KOH/g.

The polyether diol preferably has an average molecular weight $M_n$ in the range from 3,000 to 20,000 g/mol, more preferably 3'500 to 18,000 g/mol, especially 4,000 to 12,000 g/mol, most preferably 4,000 to 9,000 g/mol.

The polyether diol preferably has an average OH functionality of at least 1.8, especially at least 1.9. As a result of their production, commercial polyether diols contain a certain content of monools, as a result of which their average OH functionality is typically slightly below 2.

The polyether diol preferably has an unsaturation level of less than 0.02 meq/g, especially less than 0.01 meq/g, measured to ASTM D-2849-69. Polyether diols having an unsaturation level of less than 0.01 meq/g have especially been prepared with the aid of what are called double metal cyanide complex catalysts (DMC catalysts).

The polyether diol more preferably has an OH number in the range from 6 to 33 mg KOH/g, preferably 9 to 30 mg KOH/g, especially 12 to 30 mg KOH/g, and an average OH functionality of at least 1.9.

Suitable polyether diols are commercially available, for example as Acclaim® Polyol 4200, Acclaim® Polyol 8200 N, Acclaim® Polyol 12200 N or Acclaim® Polyol 18200 N (all from Covestro), Lupranol® 1005/1 (from BASF), Voranol® P 4000 (from Dow) or Preminol® S 4013 F (from Asahi Glass).

Preferably, polymer P1 has an average molecular weight $M_n$ in the range from 4,000 to 40,000 g/mol, determined by means of gel permeation chromatography (GPC) versus polystyrene as standard with tetrahydrofuran as mobile phase and refractive index detector.

More preferably, the average molecular weight $M_n$ is in the range from 4,500 to 30,000 g/mol, especially 5,000 to 25,000 g/mol, more preferably 5,000 to 15,000 g/mol.

The reaction of the monomeric aromatic diisocyanate with the polyether diol for preparation of the linear polymer P1 is preferably conducted with exclusion of moisture at a temperature in the range from 20 to 160° C., especially 40 to 140° C., optionally in the presence of suitable catalysts.

The reaction is preferably effected at an NCO/OH ratio in the range from 1.3/1 to 20/1. The monomeric diisocyanate remaining in the reaction mixture after reaction of the OH groups can be removed, in particular by distillation.

In one embodiment of the invention, the monomeric diisocyanate is not removed from the polymer. In that case, the NCO/OH ratio in the reaction is preferably in the range from 1.3/1 to 2.5/1. Such a polymer P1 preferably contains not more than 3.5% by weight of monomeric diisocyanate.

Preferably, polymer P1 is prepared in such a way that the NCO/OH ratio in the reaction is at least 4/1, and a majority of the monomeric aromatic diisocyanate is subsequently removed by means of a suitable separation process, such that the resultant polymer P1 containing isocyanate groups, after distillation, contains not more than 0.5% by weight of monomeric diisocyanate, especially not more than 0.3% by weight. Such a polymer P1 enables polyurethane compositions having a particularly attractive EHS classification.

The NCO/OH ratio is preferably in the range from 5/1 to 15/1.

A preferred separation method for removal of the aromatic monomeric diisocyanate is a distillative method, especially thin-film distillation or short-path distillation, preferably with application of reduced pressure.

Particular preference is given to a multistage method in which the monomeric aromatic diisocyanate is removed in a short-path evaporator with a jacket temperature in the range from 120 to 200° C. and a pressure of 0.001 to 0.5 mbar. In the case of 4,4'-MDI, which is preferred as monomeric aromatic diisocyanate, distillative removal is particularly demanding. It has to be ensured, for example, that the condensate does not solidify and block the system. Preference is given to operating at a jacket temperature in the range from 160 to 200° C. at 0.001 to 0.5 mbar, and condensing the monomer removed at a temperature in the range from 40 to 60° C.

Preference is given to reacting the monomeric aromatic diisocyanate with the polyether diol and subsequently removing the majority of the monomeric diisocyanate remaining in the reaction mixture without the use of solvents or entraining agents.

Preference is given to subsequently reusing the aromatic monomeric diisocyanate removed after the reaction, i.e. using it again for the preparation of polymer containing isocyanate groups.

The linear polymer P1 is liquid at room temperature and has comparatively low viscosity. It preferably has a viscosity at 20° C. of not more than 60 Pa·s, more preferably not more than 45 Pa·s, especially not more than 30 Pa·s. The viscosity is determined here with a cone-plate viscometer at a shear rate of 10 s$^{-1}$.

In the reaction, the OH groups of the polyether diol react with the isocyanate groups of the monomeric aromatic diisocyanate. This also results in what are called chain extension reactions, in that there is reaction of OH groups and/or isocyanate groups of reaction products between diol and monomeric diisocyanate. The higher the NCO/OH ratio chosen, the lower the level of chain extension reactions that takes place, and the lower the polydispersity and hence also the viscosity of the polymer obtained. A measure of the proportion of chain extension reactions is the average molecular weight of the polymer, or the breadth and distribution of the peaks in the GPC analysis. If unconverted monomeric diisocyanate has been removed from the polymer by means of distillation, the effective NCO content of the polymer relative to the theoretical NCO content calculated from the reaction of every OH group with a monomeric aromatic diisocyanate is a further measure of the proportion of chain extension reactions.

Preferably, a polymer P1 freed of diisocyanate monomer by means of distillation contains only a low content of chain-extended components. Its NCO content is preferably at least 90%, especially at least 95%, of the theoretical NCO content which is calculated from the addition of one mol of monomeric diisocyanate per mole of OH groups of the polyether diol.

Polymer P2 preferably has an NCO content in the range from 1.2% to 7%, especially 1.4% to 3.5%, by weight.

A suitable monomeric aromatic diisocyanate is especially diphenylmethane 4,4'-diisocyanate, optionally with fractions of diphenylmethane 2,4'- and/or 2,2'-diisocyanate (MDI), tolylene 2,4-diisocyanate or mixtures thereof with tolylene 2,6-diisocyanate (TDI), phenylene 1,4-diisocyanate (PDI), 2,3,5,6-tetramethyl-1,4-diisocyanatobenzene, naphthalene 1,5-diisocyanate (NDI) or 3,3'-dimethyl-4,4'-diisocyanatodiphenyl (TODI).

Among these, preference is given to diphenylmethane 4,4'-diisocyanate or tolylene 2,4-diisocyanate or phenylene 1,4-diisocyanate.

A particularly preferred monomeric aromatic diisocyanate is diphenylmethane 4,4'-diisocyanate (4,4'-MDI).

The 4,4'-MDI has preferably been distilled and has a purity of at least 95%, especially at least 97.5%.

The polyether triol preferably contains repeat units selected from the group consisting of 1,2-ethyleneoxy, 1,2-propyleneoxy, 1,3-propyleneoxy, 1,2-butyleneoxy and 1,4-butyleneoxy. Preference is given to 1,2-propyleneoxy groups, with or without a certain proportion of 1,2-ethyleneoxy groups.

More particularly, the polyether triol, based on all repeat units, has 80% to 100% by weight of 1,2-propyleneoxy groups and 0% to 20% by weight of 1,2-ethyleneoxy groups.

The polyether triol preferably has an OH number in the range from 21 to 160 mg KOH/g, especially 25 to 60 mg KOH/g.

The polyether triol preferably has an average OH functionality in the range from 2.3 to 3. As a result of their production, commercial polyether triols contain a certain content of monools, as a result of which their average OH functionality is typically somewhat below 3. They thus typically contain trifunctional and monofunctional components.

The polyether triol preferably has an average molecular weight $M_n$ in the range from 450 to 10,000 g/mol, more preferably 1,000 to 8,000 g/mol, especially 2'800 to 6'500 g/mol.

The polyether triol has preferably been started by means of trimethylolpropane or especially glycerol.

Suitable polyether triols are commercially available, for example as Desmophen® 3061 BT, Desmophen® 4042 BT, Desmophen® 5031 BT, Desmophen® 5034 BT or Acclaim® Polyol 6300 (all from Covestro), Lupranol® 2004/1 or Lupranol® 2095 (from BASF), Voranol® CP 450, Voranol® CP 755, Voranol® CP Voranol® CP 1050, Voranol® CP 3055, Voranol® CP 4755, Voranol® 5815 or Voranol® CP 6001 (from Dow), Caradol® ET34-08 or Caradol® ET28-03 (from Shell) or Preminol® 7001 K or Preminol® S 3011 (from Asahi Glass).

Preferably, polymer P2 has an average molecular weight $M_n$ in the range from 1,200 to 40,000 g/mol, determined by means of gel permeation chromatography (GPC) versus polystyrene as standard with tetrahydrofuran as mobile phase and refractive index detector.

More preferably, the average molecular weight $M_n$ is in the range from 2,000 to 30,000 g/mol, especially 4,000 to 20,000 g/mol.

The reaction of the monomeric aromatic diisocyanate with the polyether triol for preparation of the branched polymer P2 is preferably conducted with exclusion of moisture at a temperature in the range from 20 to 160° C., especially 40 to 140° C., optionally in the presence of suitable catalysts.

The reaction is preferably effected at an NCO/OH ratio in the range from 1.7/1 to 20/1. The monomeric diisocyanate remaining in the reaction mixture after reaction of the OH groups can be removed, in particular by distillation.

In a preferred embodiment of the invention, the monomeric diisocyanate is not removed from the polymer. In that case, the NCO/OH ratio in the reaction is preferably in the range from 1.9/1 to 2.5/1. Such a polymer P2 preferably contains not more than 3.5% by weight of monomeric diisocyanate.

In the preparation of such a polymer P2, together with the polyether triol, it is possible to use a certain proportion of polyether diol, especially having an OH number in the range from 25 to 115 mg KOH/g, preferably 25 to 60 mg KOH/g.

The ratio between the polyether triol and the polyether diol is preferably chosen here such that the average NCO functionality of polymer P2 is ultimately at least 2.2.

More preferably, polymer P2 is prepared in such a way that the NCO/OH ratio in the reaction is at least 4/1, especially in the range from 5/1 to 10/1, and a majority of the monomeric aromatic diisocyanate is subsequently removed by means of a suitable separation process, such that the resultant polymer P2 containing isocyanate groups, after distillation, contains not more than 0.5% by weight of monomeric diisocyanate, especially not more than 0.3% by weight. Such a polymer P2 is of particularly low viscosity and contributes to an attractive EHS classification for the polyurethane composition.

Preferably, the monomeric aromatic diisocyanate for the preparation of the two polymers P1 and P2 is the same monomeric aromatic diisocyanate.

Preferably, the monomeric aromatic diisocyanate for the two polymers P1 and P2 is 4,4'-MDI.

The preferred polymers enable polyurethane compositions having a particularly advantageous combination of high strength and good adhesion to plastic substrates.

Polymer P1 and polymer P2 are present in the moisture-curing polyurethane composition in a weight ratio in the range from 80/20 to 95/5. In this weight ratio, there is a surprising combination of good adhesion to plastic substrates and high strength.

The weight ratio between polymer P1 and P2 is preferably in the range from 84/16 to 93/7.

If the polyether diol for the preparation of polymer P1 has an OH number in the range from 22 to 37 mg KOH/g, especially 25 to 33 mg KOH/g, the weight ratio between polymer P1 and P2 is preferably in the range from 88/12 to 93/7.

If the polyether diol for the preparation of polymer P1 has an OH number in the range from 5 to 21 mg KOH/g, especially 6 to 19 mg KOH/g, the weight ratio between polymer P1 and P2 is preferably in the range from 84/16 to 91/9.

In the preferred weight ratios, the combination of good adhesion and high strength is particularly advantageous.

Preferably, the moisture-curing polyurethane composition has a content of the sum total of polymer P1 and polymer P2 based on the overall composition in the range from 20% to 80% by weight, especially 30% to 70% by weight, more preferably 40% to 60% by weight.

In addition to polymers P1 and P2, the moisture-curing polyurethane composition may contain at least one additional polymer containing isocyanate groups that does not correspond to polymer P1 or P2.

Suitable polymers are polyether-based polymers having aliphatic isocyanate groups, and polymers containing polyester polyols, polycarbonate polyols, poly(meth)acrylate polyols, polyhydroxy-functional fats or oils, polyhydrocarbon polyols or further polyols.

The moisture-curing polyurethane composition preferably contains a total content of monomeric diisocyanates of less than 0.1% by weight.

The moisture-curing polyurethane composition optionally contains plasticizer, where not more than 15% by weight of plasticizer based on the overall composition is present. Plasticizers are more likely to have an adverse effect on adhesion to plastic substrates, which is why they are not used in too high an amount. Preferably, the moisture-curing polyurethane composition contains not more than 10% by weight, especially not more than 5% by weight, of plasticizer.

Suitable plasticizers are in particular carboxylic esters, such as phthalates, in particular diisononyl phthalate (DINP), diisodecyl phthalate (DIDP) or di(2-propylheptyl) phthalate (DPHP), hydrogenated phthalates or cyclohexane-1,2-dicarboxylate esters, in particular hydrogenated diisononyl phthalate or diisononyl cyclohexane-1,2-dicarboxylate (DINCH), terephthalates, in particular bis(2-ethylhexyl) terephthalate (DOTP) or diisononyl terephthalate (DINT), hydrogenated terephthalates or cyclohexane-1,4-dicarboxylate esters, in particular hydrogenated bis(2-ethylhexyl) terephthalate or bis(2-ethylhexyl) cyclohexane-1,4-dicarboxylate, or hydrogenated diisononyl terephthalate or diisononyl cyclohexane-1,4-dicarboxylate, isophthalates, trimellitates, adipates, in particular dioctyl adipate, azelates, sebacates, benzoates, glycol ethers, glycol esters, plasticizers having polyether structure, in particular polypropylene oxide monools, diols or triols having blocked hydroxyl groups, in particular in the form of acetate groups, organic phosphoric or sulfonic esters, polybutenes, polyisobutenes or plasticizers derived from natural fats or oils, in particular epoxidized soybean or linseed oil.

Preferred plasticizers are phthalates, hydrogenated phthalates, adipates or plasticizers having polyether structure.

The moisture-curing polyurethane composition preferably comprises at least one further constituent selected from the group consisting of fillers, oligomeric diisocyanates, blocked amines, catalysts and stabilizers.

Suitable fillers are especially ground or precipitated calcium carbonates, optionally coated with fatty acids, especially stearates, barytes, quartz flours, quartz sands, dolomites, wollastonites, calcined kaolins, sheet silicates, such as mica or talc, zeolites, aluminum hydroxides, magnesium hydroxides, silicas, including finely divided silicas from pyrolysis processes, cements, gypsums, fly ashes, industrially produced carbon blacks, graphite, metal powders, for example of aluminum, copper, iron, silver or steel, PVC powders or hollow beads.

Preference is given to calcium carbonates that have optionally been coated with fatty acids, especially stearates, calcined kaolins or industrially produced carbon blacks.

Suitable oligomeric diisocyanates are especially HDI biurets such as Desmodur® N 100 or N 3200 (from Covestro), Tolonate® HDB or HDB-LV (from Vencorex) or Duranate® 24A-100 (from Asahi Kasei); HDI isocyanurates such as Desmodur® N 3300, N 3600 or N 3790 BA (all from Covestro), Tolonate® HDT, HDT-LV or HDT-LV2 (from Vencorex), Duranate® TPA-100 or THA-100 (from Asahi Kasei) or Coronate® HX (from Nippon Polyurethane); HDI uretdiones such as Desmodur® N 3400 (from Covestro); HDI iminooxadiazinediones such as Desmodur® XP 2410 (from Covestro); HDI allophanates such as Desmodur® VP LS 2102 (from Covestro); IPDI isocyanurates, for example in solution as Desmodur® Z 4470 (from Covestro) or in solid form as Vestanat® T1890/100 (from Evonik); TDI oligomers such as Desmodur® IL (from Covestro); or mixed isocyanurates based on TDI/HDI, such as Desmodur® HL (from Covestro), where "HDI" stands for hexane 1,6-diisocyanate, "IPDI" for isophorone diisocyanate, and "TDI" for tolylene 2,4-diisocyanate or mixtures thereof with tolylene 2,6-diisocyanate.

Preferably, the moisture-curing polyurethane composition contains only a low content of oligomeric diisocyanates, preferably less than 5% by weight, more preferably less than 3% by weight, especially less than 1% by weight, based on the overall composition.

A suitable blocked amine preferably has at least one aldimino group or oxazolidino group. On contact with moisture, it is hydrolyzed with release of the amino group and reacts with available isocyanate groups, and can promote rapid, blister-free curing, a particularly nontacky surface and/or particularly good mechanical properties.

Preferred oxazolidines are bisoxazolidines, especially those derived from isobutyraldehyde, benzaldehyde or substituted benzaldehyde, especially benzaldehyde substituted in the para position by an optionally branched alkyl group having 10 to 14 carbon atoms.

Preference is given to bisoxazolidines from the reaction of OH-functional monooxazolidines with diisocyanates, especially hexamethylene 1,6-diisocyanate. Suitable monooxazolidines are especially obtained from the reaction of diethanolamine and an aldehyde with release and removal of water.

Suitable aldimines are especially di- or trialdimines from the reaction of commercial primary di- or triamines with non-enolizable aldehydes. These are aldehydes that do not have a hydrogen atom in the alpha position to the carbon atom of the aldehyde group.

Particularly preferred blocked amines are selected from the group consisting of N,N'-bis(2,2-dimethyl-3-lauroyloxy-propylidene)hexylene-1,6-diamine, N,N'-bis(2,2-dimethyl-3-acetoxypropylidene)-3-aminomethyl-3,5,5-trimethylcyclohexylamine, N,N'-bis(2,2-dimethyl-3-lauroyloxypropylidene)-3-aminomethyl-3,5,5-trimethylcyclohexylamine, N,N'-bis(benzylidene)-3-aminomethyl-3,5,5-trimethylcyclohexylamine, N,N'-bis(4-$C_{10-14}$-alkylbenzylidene)-3-aminomethyl-3,5,5-trimethylcyclohexylamine, N,N'-bis(2,2-dimethyl-3-acetoxypropylidene)polyoxypropylenediamine having an average molecular weight $M_n$ in the range from 450 to 750 g/mol, N,N'-bis(2,2-dimethyl-3-lauroyloxypropylidene) polyoxypropylenediamine having an average molecular weight $M_n$ in the range from 750 to 1,050 g/mol, N,N'-bis (benzylidene)polyoxypropylenediamine having an average molecular weight $M_n$ in the range from 380 to 680 g/mol, N,N'-bis(4-$C_{10-14}$-alkylbenzylidene)polyoxypropylenediamine having an average molecular weight $M_n$ in the range from 680 to 1,100 g/mol N,N',N"-tris(2,2-dimethyl-3-acetoxypropylidene)polyoxypropylenetriamine having an average molecular weight $M_n$ in the range from 730 to 880 g/mol and N,N',N"-tris(2,2-dimethyl lauroyloxypropylidene)polyoxypropylenetriamine having an average molecular weight $M_n$ in the range from 1,150 to 1,300 g/mol.

Suitable catalysts are catalysts for accelerating the reaction of isocyanate groups, in particular organotin(IV) compounds, such as, in particular, dibutyltin diacetate, dibutyltin dilaurate, dibutyltin dichloride, dibutyltin diacetylacetonate, dimethyltin dilaurate, dioctyltin diacetate, dioctyltin dilaurate or dioctyltin diacetylacetonate, complexes of bismuth (III) or zirconium(IV), in particular with ligands selected from alkoxides, carboxylates, 1,3-diketonates, oxinate, 1,3-ketoesterates, and 1,3-ketoamidates, or compounds containing tertiary amino groups, such as, in particular, 2,2'-dimorpholinodiethyl ether (DMDEE).

If the moisture-curing polyurethane composition contains blocked amines, suitable catalysts are also catalysts for the hydrolysis of the blocked amino groups, especially organic acids, especially aromatic carboxylic acids such as benzoic acid, 2-nitrobenzoic acid or salicylic acid.

Also especially suitable are combinations of different catalysts.

Suitable stabilizers are especially stabilizers against oxidation, heat, light or UV radiation. The composition preferably comprises at least one UV stabilizer.

The moisture-curing polyurethane composition may contain further additions, in particular inorganic or organic pigments, in particular titanium dioxide, chromium oxides or iron oxides;

fibers, in particular glass fibers, carbon fibers, metal fibers, ceramic fibers, polymer fibers, such as polyamide fibers or polyethylene fibers, or natural fibers, such as wool, cellulose, hemp or sisal;

nanofillers such as graphene or carbon nanotubes;

dyes;

desiccants, in particular molecular sieve powders, calcium oxide, highly reactive isocyanates such as p-tosyl isocyanate, monooxazolidines such as Incozol® 2 (from Incorez) or orthoformic esters;

adhesion promoters, in particular organoalkoxysilanes, in particular epoxysilanes, such as in particular 3-glycidoxypropyltrimethoxysilane or 3-glycidoxypropyltriethoxysilane, (meth)acrylosilanes, anhydridosilanes, carbamatosilanes, alkylsilanes or iminosilanes, or oligomeric forms of these silanes, or titanates;

further catalysts that accelerate the reaction of the isocyanate groups;

rheology modifiers, in particular thickeners, in particular sheet silicates, such as bentonites, derivatives of castor oil, hydrogenated castor oil, polyamides, polyamide waxes, polyurethanes, urea compounds, fumed silicas, cellulose ethers or hydrophobically modified polyoxyethylenes;

solvents, in particular acetone, methyl acetate, tert-butyl acetate, 1-methoxy-2-propyl acetate, ethyl 3-ethoxypropionate, diisopropyl ether, diethylene glycol diethyl ether, ethylene glycol diethyl ether, ethylene glycol monobutyl ether, ethylene glycol mono-2-ethylhexyl ether, acetals such as propylal, butylal, 2-ethylhexylal, dioxolane, glycerol formal or 2,5,7,10-tetraoxaundecane (TOU), toluene, xylene, heptane, octane, naphtha, white spirit, petroleum ether or gasoline, in particular Solvesso™ grades (from Exxon), and propylene carbonate, dimethyl carbonate, butyrolactone, N-methylpyrrolidone, N-ethylpyrrolidone, p-chlorobenzotrifluoride or benzotrifluoride;

natural resins, fats or oils, such as rosin, shellac, linseed oil, castor oil or soybean oil;

nonreactive polymers, in particular homo- or copolymers of unsaturated monomers, in particular from the group comprising ethylene, propylene, butylene, isobutylene, isoprene, vinyl acetate or alkyl (meth)acrylates, in particular polyethylenes (PE), polypropylenes (PP), polyisobutylenes, ethylene/vinyl acetate copolymers (EVA) or atactic poly-α-olefins (APAO);

flame-retardant substances, especially the already mentioned fillers aluminum hydroxide or magnesium hydroxide, or organic phosphoric esters;

additives, in particular wetting agents, levelling agents, defoamers, deaerating agents or biocides;

or further substances customarily used in moisture-curing polyurethane compositions.

It may be advisable to chemically or physically dry certain substances before mixing them into the composition.

When polymers containing isocyanate groups are mixed with further constituents of the composition, especially fillers, the content of monomeric diisocyanates may be further reduced by reaction with moisture present.

The moisture-curing polyurethane composition preferably contains

30% to 70% by weight of polymer containing isocyanate groups,

20% to 60% by weight of fillers,

0% to 15% by weight, especially 0% to 5% by weight, of plasticizers, and optionally further constituents, especially blocked amines or catalysts.

The moisture-curing polyurethane composition, after curing, has high strength coupled with high extensibility.

Tensile strength, determined as described in the examples, is preferably at least 1.5 MPa, more preferably at least 2 MPa, especially at least 3 MPa.

The modulus of elasticity in the range from 0.05% to 5% elongation, determined as described in the examples, is preferably in the range from 2.5 to 20 MPa, especially 3 to 15 MPa.

Elongation at break, determined as described in the examples, is preferably at least 300%, especially at least 500%.

The moisture-curing polyurethane composition is in particular produced with exclusion of moisture and stored at ambient temperature in moisture-tight containers. A suitable moisture-tight container especially consists of an optionally coated metal and/or plastic, and is especially a drum, a transport box, a hobbock, a bucket, a canister, a can, a bag, a tubular bag, a cartridge or a tube.

The moisture-curing polyurethane composition may be in the form of a one-component composition or in the form of a multi-component, in particular two-component, composition.

A composition referred to as a "one-component" composition is one in which all constituents of the composition are in the same container and which is storage-stable as is.

A composition referred to as a "two-component" composition is one in which the constituents of the composition are present in two different components that are stored in separate containers and are not mixed with one another until shortly before or during the application of the composition.

The moisture-curing polyurethane composition is preferably a one-component composition. Given suitable packaging and storage, it is storage-stable, typically for several months up to one year or longer.

On application of the moisture-curing polyurethane composition, the curing process commences. This results in the cured composition.

In the case of a one-component composition, it is applied as is and then begins to cure under the influence of moisture or water. For acceleration of the curing, an accelerator component which contains or releases water and/or a catalyst and/or a curing agent can be mixed into the composition on application, or the composition, after application thereof, can be contacted with such an accelerator component.

In the course of curing, the isocyanate groups react with one another under the influence of moisture. If the moisture-curing polyurethane composition contains a blocked amine, the isocyanate groups additionally react with the blocked amino groups as they are hydrolyzed. The totality of these reactions of isocyanate groups that lead to the curing of the composition is also referred to as crosslinking.

The moisture needed for curing the moisture-curing polyurethane composition preferably gets into the composition through diffusion from the air (atmospheric moisture). In the process, a solid layer of cured composition ("skin") is formed on the surfaces of the composition which come into contact with air. Curing proceeds in the direction of diffusion from the outside inward, the skin becoming increasingly thick and ultimately covering the entire composition that was applied. The moisture can also get into the composition additionally or entirely from one or more substrate(s) to which the composition has been applied and/or can come from an accelerator component that is mixed into the composition on application or is contacted therewith after application, for example by painting or spraying.

The moisture-curing polyurethane composition is preferably applied at ambient temperature, in particular within a range from about −10 to 50° C., preferably within a range from −5 to 45° C., in particular 0 to 40° C.

The moisture-curing polyurethane composition is preferably likewise cured at ambient temperature.

The moisture-curing polyurethane composition has a long processing time (open time) and rapid curing.

If the moisture-curing polyurethane composition contains a blocked amine, the aldehyde used for the blocking of the amino groups is released in the course of crosslinking. If this is largely nonvolatile, it will remain for the most part in the cured composition and act as plasticizer.

Preference is given to using the moisture-curing polyurethane composition as elastic adhesive or elastic sealant or elastic coating.

The moisture-curing polyurethane composition as adhesive and/or sealant is especially suitable for bonding and sealing applications in the construction and manufacturing industry or in motor vehicle construction, especially for parquet bonding, assembly, bonding of installable components, module bonding, pane bonding, join sealing, bodywork sealing, seam sealing or cavity sealing.

Elastic bonds in vehicle construction are, for example, the bonded attachment of parts such as plastic covers, trim strips, flanges, fenders, driver's cabins or other installable components to the painted body of a vehicle, or the bonding of panes into the vehicle body, said vehicles especially being automobiles, trucks, buses, rail vehicles or ships.

The moisture-curing polyurethane composition is especially suitable as sealant for the elastic sealing of all kinds of joins, seams or cavities, especially of joins in construction, such as expansion joins or connection joins between structural components, especially components made of plastic, or of floor joins in civil engineering. A sealant having flexible properties and high cold flexibility is particularly suitable especially for the sealing of expansion joins in built structures. As a coating, the moisture-curing polyurethane composition is especially suitable for protection and/or for sealing of built structures or parts thereof, especially in the field of materials made of plastic, especially for balconies, terraces, roofs, especially flat roofs or slightly inclined roof areas or roof gardens, or in building interiors beneath tiles or ceramic plates in wet rooms or kitchens, or in collection pans, conduits, shafts, silos, tanks or wastewater treatment systems.

It can also be used for repair purposes as seal or coating, for example of leaking roof membranes or floor coverings that are no longer fit for purpose, or as repair compound for highly reactive spray seals.

The moisture-curing polyurethane composition can be formulated such that it has a pasty consistency with structurally viscous properties. A composition of this kind is applied by means of a suitable device, for example from commercial cartridges or kegs or hobbocks, for example in the form of a bead, which may have an essentially round or triangular cross-sectional area.

The moisture-curing polyurethane composition can also be formulated such that it is fluid and "self-leveling" or only slightly thixotropic and can be poured out for application. As coating, it can, for example, subsequently be distributed flat up to the desired layer thickness, for example by means of a roller, a slide bar, a toothed applicator or a trowel. In one operation, typically a layer thickness in the range from 0.5 to 3 mm, especially 1 to 2.5 mm, is applied.

The moisture-curing polyurethane composition is preferably used for bonding, sealing or coating of at least one plastic substrate.

Suitable plastic substrates are especially rigid and flexible PVC, polycarbonate, polystyrene, polyester, polyamide, PMMA, ABS, SAN, epoxy resins, phenolic resins, PUR, POM, TPO, PE, PP, EPM, EPDM, or blends of polycarbonate and further plastics such as, in particular, ABS and/or SAN, where these plastics may each be in untreated or surface-treated form, treated by means of plasma, corona or flames for example, and fiber-reinforced plastics such as, in particular, carbon fiber-reinforced plastics (CFRP), glass fiber-reinforced plastics (GFRP) or sheet molding compounds (SMC).

Preferably, the plastic substrate is selected from the group consisting of rigid PVC, flexible PVC, polycarbonate, polystyrene, polyester, polyamide, PMMA, ABS, SAN, epoxy resins, phenolic resins, PUR, POM, TPO, PE, PP, EPM, EPDM, and blends of polycarbonate with further plastics such as, in particular, ABS and/or SAN Among these, preference is given to rigid PVC, polycarbonate, blends of polycarbonate with ABS and/or SAN, PMMA or ABS, especially polycarbonate or blends of polycarbonate. These plastics are particularly critical in relation to good adhesion without complex pretreatment, and have to be bonded particularly frequently.

Suitable further substrates which can be bonded or sealed or coated with the moisture-curing polyurethane composition are especially metals or alloys, such as aluminum, copper, iron, steel, nonferrous metals, including surface-finished metals or alloys, such as zinc-plated or chromium-plated metals;
  coated or painted substrates, especially painted tiles, coated concrete, powder-coated metals or alloys or painted metal sheets;
  paints or varnishes, especially automotive topcoats;
  glass, glass ceramic, concrete, mortar, cement screed, fiber cement, especially fiber cement boards, brick, tile, gypsum, especially gypsum boards or anhydride screed, or natural stone, such as granite or marble;
  repair or leveling compounds based on PCC (polymer-modified cement mortar) or ECC (epoxy resin-modified cement mortar);
  asphalt or bitumen;
  leather, textiles, paper, wood, wood materials bonded with resins, such as phenolic, melamine or epoxy resins, resin/textile composites or further materials called polymer composites;
  insulation foams, especially made of EPS, XPS, PUR, PIR, rock wool, glass wool or foamed glass.

If required, the substrates can be pretreated prior to application, especially by physical and/or chemical cleaning methods or the application of an activator or a primer.

It is possible to bond and/or seal two identical or two different substrates.

The moisture-curing polyurethane composition is preferably used in a method of bonding or sealing, comprising the steps of (i) applying the moisture-curing polyurethane composition described
  to a first substrate and contacting the composition with a second substrate within the open time of the composition, or
  to a first and to a second substrate and joining the two substrates within the open time of the composition, or between two substrates,
  (ii) curing the composition by contact with moisture.

The moisture-curing polyurethane composition is also preferably used in a method of coating or sealing, comprising the steps of (i) applying the moisture-curing polyurethane composition described to a substrate,
  (ii) curing the composition by contact with moisture.

In these methods, preferably at least one of the substrates is a plastic substrate, as described above.

The application and curing of the moisture-curing polyurethane composition affords an article bonded or sealed or coated with the composition. This article may be a built structure or a part thereof, especially a built structure in civil engineering above or below ground, a roof, a staircase or a façade, or it may be an industrial good or a consumer good, especially a window, a lamp, a traffic signal, a domestic appliance or a mode of transport, such as, in particular, an automobile, a bus, a caravan, a truck, a rail vehicle, a ship, an aircraft or a helicopter, or an installable component thereof, for example a window made of organic glass, a panorama roof or a lamp housing.

The invention further provides the cured composition obtained from the moisture-curing polyurethane composition after contact thereof with moisture.

The invention further provides an adhesive bond comprising at least one plastic substrate and the composition cured by contact with moisture, as described above.

It is a feature of the moisture-curing polyurethane composition that it has good storage stability with exclusion of moisture, cures rapidly with a long open time, and after curing has markedly elastic properties with high elongation, surprisingly high strength and surprisingly good adhesion to plastic substrates, even though the composition is formulated such that it has a very low content of monomeric diisocyanates and hence an attractive EHS classification.

EXAMPLES

Working examples are adduced hereinafter, which are intended to further elucidate the invention described. The invention is of course not limited to these described working examples.

"Standard climatic conditions" ("SCC") refer to a temperature of 23±1° C. and a relative air humidity of 50±5%.

Unless stated otherwise, the chemicals used were from Sigma-Aldrich.

Viscosity was measured with a thermostated Rheotec RC30 cone-plate viscometer (cone diameter 25 mm, cone angle 1°, cone tip-plate distance 0.05 mm, shear rate 10 s$^{-1}$).

Monomeric diisocyanate content was determined by means of HPLC (detection via photodiode array; 0.04 M sodium acetate/acetonitrile as mobile phase) after prior derivatization by means of N-propyl-4-nitrobenzylamine.

Polyols Used:

Acclaim® 4200: polyoxypropylene diol, OH number 28 mg KOH/g (from Covestro)
  Acclaim® 8200N: polyoxypropylene diol, OH number 14 mg KOH/g (from Covestro)
  Acclaim® 12200: polyoxypropylene diol, OH number 10 mg KOH/g (from Covestro)

Desmophen® 5031 BT: ethylene oxide-terminated poly-
oxypropylene triol, OH number 28 mg KOH/g (from
Covestro)

Voranol® CP 4755: ethylene oxide-terminated polyoxy-
propylene triol, OH number 35.0 mg KOH/g (from
Dow)

Monomeric Diisocyanates Used:

Desmodur® 44 MC L: diphenylmethane 44,4'-diisocya-
nate having an NCO content of 33.6% by weight (from
Covestro)

Preparation of Polymers Containing Isocyanate Groups:

Polymer L1 (Linear):

727 g (0.36 eq OH) of Acclaim® 4200 and 273 g (2.18 eq
NCO) of Desmodur® 44 MC L were reacted by a known
method at 80° C. to give a polymer having an NCO content
of 7.4% by weight, a viscosity of 5.2 Pa·s at 20° C. and a
monomeric diphenylmethane 4,4'-diisocyanate content of
about 17% by weight.

Subsequently, the volatile constituents, especially a
majority of the monomeric diphenylmethane 4,4'-diisocya-
nate, were removed by distillation in a short-path evaporator
(jacket temperature 180° C., pressure 0.1 to 0.005 mbar,
condensation temperature 47° C.). The linear polymer thus
obtained had an NCO content of 1.8% by weight, a viscosity
of 13.3 Pa·s at 20° C. and a monomeric diphenylmethane
4,4'-diisocyanate content of 0.08% by weight.

Polymer L2 (Linear):

400 g (0.20 eq OH) of Acclaim® 4200 and 52 g (0.41 eq
NCO) of Desmodur® 44 MC L were converted by a known
method at 80° C. to an NCO-terminated polymer. The linear
polymer thus obtained had an NCO content of 1.8% by
weight, a viscosity of 33 Pa·s at 20° C. and a monomeric
diphenylmethane 4,4'-diisocyanate content of about 2.5% by
weight.

Polymer L3 (Linear):

757.7 g (0.19 eq OH) of Acclaim® 8200N and 242.3 g
(1.9 eq NCO) of Desmodur® 44 MC L were reacted by a
known method at 80° C. to give a polymer having an NCO
content of 7.2% by weight, a viscosity of 6.8 Pa·s at 20° C.
and a monomeric diphenylmethane 4,4'-diisocyanate con-
tent of about 20% by weight.

Subsequently, the volatile constituents, especially a
majority of the monomeric diphenylmethane 4,4'-diisocya-
nate, were removed by distillation in a short-path evaporator
(jacket temperature 180° C., pressure 0.1 to 0.005 mbar,
condensation temperature 47° C.). The linear polymer thus
obtained had an NCO content of 1.0% by weight, a viscosity
of 25.0 Pa·s at 20° C. and a monomeric diphenylmethane
4,4'-diisocyanate content of 0.06% by weight.

Polymer L4 (Linear):

812.0 g (0.15 eq OH) of Acclaim® 12200N and 188.0 g
(1.5 eq NCO) of Desmodur® 44 MC L were reacted by a
known method at 80° C. to give a polymer having an NCO
content of 5.6% by weight, a viscosity of 13.9 Pa·s at 20° C.
and a monomeric diphenylmethane 4,4'-diisocyanate con-
tent of about 14% by weight. Subsequently, the volatile
constituents, especially a majority of the monomeric diphe-
nylmethane 4,4'-diisocyanate, were removed by distillation
in a short-path evaporator (jacket temperature 180° C.,
pressure 0.1 to 0.005 mbar, condensation temperature 47°
C.). The linear polymer thus obtained had an NCO content of 0.7% by weight, a viscosity of 29.4 Pa·s at 20° C. and a
monomeric diphenylmethane 4,4'-diisocyanate content of
0.04% by weight.

Polymer C1 (Branched):

725.0 g (0.36 eq OH) of Desmophen® 5031 BT and 275
g (2.2 eq NCO) of Desmodur® 44 MC L were reacted by a
known method at 80° C. to give a polymer having an NCO
content of 7.6% by weight, a viscosity of 6.5 Pa·s at 20° C.
and a monomeric diphenylmethane 4,4'-diisocyanate con-
tent of about 20% by weight. Subsequently, the volatile
constituents, especially a majority of the monomeric diphe-
nylmethane 4,4'-diisocyanate, were removed by distillation
in a short-path evaporator (jacket temperature 180° C.,
pressure 0.1 to 0.005 mbar, condensation temperature 47°
C.). The polymer thus obtained had an NCO content of 1.7%
by weight, a viscosity of 19 Pa·s at 20° C. and a monomeric
diphenylmethane 4,4'-diisocyanate content of 0.04% by
weight.

Polymer C2 (Branched):

685 g of Voranol® CP 4755, 115 g of Desmodur® 44 MC
L and 200 g of diisodecyl phthalate were reacted by a known
method at 80° C. to give a polymer having an NCO content
of 2.0% by weight, a viscosity of 55 Pa·s at 20° C. and a
monomeric diphenylmethane 4,4'-diisocyanate content of
about 2.5% by weight.

Moisture-Curing Polyurethane Compositions:

Compositions Z1 to Z15:

For each composition, the ingredients specified in tables
1 to 4 were mixed in the amounts specified (in parts by
weight) by means of a centrifugal mixer (SpeedMixer™
DAC 150, FlackTek Inc.) with exclusion of moisture at 3000
rpm for one minute and stored with exclusion of moisture.
The compositions were tested as follows:

As a measure of the open time, skin time (ST) was
determined. For this purpose, a few grams of the composi-
tion was applied to cardboard in a layer thickness of about
2 mm and, under standard climatic conditions, the period of
time after which no residues remained any longer on an
LDPE pipette used to gently tap the surface of the compo-
sition was determined.

Shore A hardness was determined to DIN 53505 on test
specimens cured under standard climatic conditions for 14
days.

To determine the mechanical properties, the composition
was applied to a silicone-coated release paper to give a film
of thickness 2 mm, which was stored under standard climatic
conditions for 14 days, and a few dumbbells having a length
of 75 mm with a bar length of 30 mm and a bar width of 4
mm were punched out of the film and these were tested in
accordance with DIN EN 53504 at a strain rate of 200
mm/min for tensile strength (breaking force), elongation at
break, and 5% modulus of elasticity (at 0.5-5% elongation).

Adhesion to plastic substrates was determined by apply-
ing the composition in the form of four parallel beads of
width about 10 mm, height 5 mm and length 15 mm to the
respective substrate, and curing under standard climatic
conditions for 7 days. Subsequently, the adhesion of the
cured composition was tested for a first time by making an
incision into the first bead at the narrow end just above the
bonding surface, holding the cut end of the bead with
rounded tweezers and trying to pull the bead away from the substrate. Then the bead was incised again down to the substrate, the part that had been cut away was rolled up with the rounded tweezers and another attempt was made to pull the bead away from the substrate. In this way, the whole bead was cut away from the substrate by pulling. Subsequently, adhesion was assessed from the failure profile and was reported in table 1, 2 or 3 under "7d SCC". Some of the test specimens were then stored immersed in deionized water for 7 days, then stored under standard climatic conditions for 2 hours, and then the second bead was cut away from the substrate by pulling with the rounded tweezers and adhesion was assessed from the failure profile and reported in table 1, 2 or 3 under "7d $H_2O$". Then the test specimens were stored at 80° C. in an air circulation oven for 24 hours, followed by 2 hours under standard climatic conditions, and then the third bead was tested for adhesion as described, and adhesion was assessed from the failure profile and reported in table 1, 2 or 3 under "1d 80° C.". Finally, the test specimens were stored at 70° C. and 100% relative humidity for 7 days, followed by 2 hours under standard climatic conditions, and the fourth bead was tested for adhesion as described, and adhesion was assessed from the failure profile and reported in table 1, 2 or 3 under "7d 70° C./100% RH".

The plastic substrates used were the following plastic sheets (300×200×2 mm):

PMMA: Plexiglas® XT 0A000 (from Evonik Rohm)

PC: Makrolon® GP clear 099 (uncoated polycarbonate, from Covestro)

ABS: Metzoplast ABS/G (from Metzeler Plastics GmbH)

PVC: KömaDur® ES (from Kömmerling Kunststoffe)

Adhesion was assessed under the following scale:

100 represents more than 95% cohesive failure and means very good adhesion.

70 to 90 represents 70% to 90% cohesive failure and means good adhesion.

5 represents 5% cohesive failure and means inadequate adhesion.

0 represents 0% cohesive failure (100% adhesive failure) and means poor adhesion.

The results are reported in tables 1 to 4.

Comparative examples are identified by (Ref.).

TABLE 1

| Composition | Z1 (Ref.) | Z2 | Z3 | Z4 | Z5 | Z6 | Z7 (Ref.) |
|---|---|---|---|---|---|---|---|
| Polymer L1 | 41.4 | 47.4 | 48.7 | 49.4 | 50.4 | 51.4 | 53.4 |
| Polymer C1 | 14.0 | 8.0 | 6.7 | 6.0 | 5.0 | 4.0 | 2.0 |
| pTSI[1] | 0.4 | 0.4 | 0.4 | 0.4 | 0.4 | 0.4 | 0.4 |
| Carbon black | 10.0 | 10.0 | 10.0 | 10.0 | 10.0 | 10.0 | 10.0 |
| Chalk[2] | 32.0 | 32.0 | 32.0 | 32.0 | 32.0 | 32.0 | 32.0 |
| Silica[3] | 2.0 | 2.0 | 2.0 | 2.0 | 2.0 | 2.0 | 2.0 |
| DMDEE[4] | 0.2 | 0.2 | 0.2 | 0.2 | 0.2 | 0.2 | 0.2 |
| Polymer ratio[5] | 75/25 | 86/14 | 88/12 | 89/11 | 91/9 | 93/7 | 96/4 |
| Shore A | 44 | 48 | 48 | 47 | 38 | 41 | 36 |
| Tensile strength [MPa] | 6.3 | 4.9 | 6.5 | 6.3 | 5.5 | 2.3 | 0.9 |
| Elongation at break [%] | 900 | 1230 | 1060 | 1130 | 1100 | 1000 | 890 |
| Modulus of elasticity 5% [MPa] | 4.3 | 4.4 | 4.9 | 5.0 | 4.9 | 4.5 | 3.4 |
| PC adhesion | | | | | | | |
| 7 d SCC | 100 | 100 | 100 | 100 | 100 | 100 | 100 |
| 7 d $H_2O$ | 100 | 100 | 100 | 100 | 100 | 100 | 100 |
| 1 d 80° C. | 100 | 100 | 100 | 100 | 100 | 100 | 100 |
| 7 d 70° C./100% RH | 0 | 5 | 5 | 85 | 90 | 100 | 100 |
| PMMA adhesion | | | | | | | |
| 7 d SCC | 0 | 70 | 90 | 100 | 100 | 100 | 100 |

[1]p-toluenesulfonyl isocyanate

[2]Omyacarb ® 5 GU (from Omya).

[3]Aerosil ® R 972 (from Evonik)

[4]2,2'-dimorpholinodiethyl ether

[5]weight ratio between linear and branched polymer

TABLE 2

Composition (in parts by weight) and properties of Z4 and Z8 to Z10.

| Composition | Z4 | Z8 | Z9 | Z10 |
|---|---|---|---|---|
| Polymer L1 | 49.4 | — | 49.4 | — |
| Polymer L2 | — | 49.4 | — | 49.4 |
| Polymer C1 | 6.0 | 6.0 | — | — |
| Polymer C2 | — | — | 7.5 | 7.5 |
| pTSI[1] | 0.4 | 0.4 | 0.4 | 0.4 |
| Carbon black | 10.0 | 10.0 | 10.0 | 10.0 |
| Chalk[2] | 32.0 | 32.0 | 30.5 | 30.5 |
| Silica[3] | 2.0 | 2.0 | 2.0 | 2.0 |
| DMDEE[4] | 0.2 | 0.2 | 0.2 | 0.2 |
| Polymer ratio[5] | 89/11 | 89/11 | 89/11 | 89/11 |
| ST [min.] | 70 | 70 | 70 | 65 |
| Shore A | 47 | 53 | 48 | 61 |
| Tensile strength [MPa] | 6.3 | 6.8 | 7.2 | 6.1 |
| Elongation at break [%] | 1130 | 862 | 1135 | 745 |
| Modulus of elasticity 5% [MPa] | 5.0 | 8.4 | 4.9 | 8.8 |
| PC adhesion | | | | |
| 7 d SCC | 100 | 100 | 100 | 100 |
| 7 d H$_2$O | 100 | 100 | 100 | 100 |
| 1 d 80° C. | 100 | 100 | 100 | 100 |
| 7 d 70° C./100% RH | 85 | 90 | 90 | 80 |
| PMMA adhesion | | | | |
| 7 d SCC | 100 | 100 | 100 | 100 |

[1]p-toluenesulfonyl isocyanate
[2]Omyacarb ® 5 GU (from Omya).
[3]Aerosil ® R 972 (from Evonik)
[4]2,2'-dimorpholinodiethyl ether
[5]weight ratio between linear and branched polymer (polymer C2 contains 10% by weight of plasticizer)

TABLE 3

Composition (in parts by weight) and properties of Z11 to Z14.

| Composition | Z11 (Ref.) | Z12 | Z13 | Z14 (Ref.) |
|---|---|---|---|---|
| Polymer L3 | 41.4 | 47.4 | 49.4 | 53.4 |
| Polymer C1 | 14.0 | 8.0 | 6.0 | 2.0 |
| pTSI[1] | 0.4 | 0.4 | 0.4 | 0.4 |
| Carbon black | 10.0 | 10.0 | 10.0 | 10.0 |
| Chalk[2] | 32.0 | 32.0 | 32.0 | 32.0 |
| Silica[3] | 2.0 | 2.0 | 2.0 | 2.0 |
| DMDEE[4] | 0.2 | 0.2 | 0.2 | 0.2 |
| Polymer ratio[5] | 75/25 | 86/14 | 89/11 | 96/4 |
| Shore A | 49 | 45 | 45 | 28 |
| Tensile strength [MPa] | 6.7 | 3.8 | 2.4 | 0.4 |
| Elongation at break [%] | 1040 | 1170 | 1135 | 53 |
| Modulus of elasticity 5% [MPa] | 3.9 | 3.8 | 3.8 | 2.4 |
| PC adhesion | | | | |
| 7 d SCC | 100 | 100 | 100 | 100 |
| 7 d H$_2$O | 100 | 100 | 100 | 0 |
| 1 d 80° C. | 100 | 100 | 100 | 100 |
| 7 d 70° C./100% RH | 0 | 100 | 100 | 0 |

[1]p-toluenesulfonyl isocyanate
[2]Omyacarb ® 5 GU (from Omya).
[3]Aerosil ® R 972 (from Evonik)
[4]2,2'-dimorpholinodiethyl ether
[5]weight ratio between linear and branched polymer

TABLE 4

Composition (in parts by weight) and properties of Z15 to Z18.

| Composition | Z15 (Ref.) | Z16 | Z17 | Z18 (Ref.) |
|---|---|---|---|---|
| Polymer L4 | 41.4 | 47.4 | 49.4 | 53.4 |
| Polymer C1 | 14.0 | 8.0 | 6.0 | 2.0 |
| pTSI[1] | 0.4 | 0.4 | 0.4 | 0.4 |
| Carbon black | 10.0 | 10.0 | 10.0 | 10.0 |
| Chalk[2] | 32.0 | 32.0 | 32.0 | 32.0 |
| Silica[3] | 2.0 | 2.0 | 2.0 | 2.0 |
| DMDEE[4] | 0.2 | 0.2 | 0.2 | 0.2 |
| Polymer ratio[5] | 75/25 | 86/14 | 89/11 | 96/4 |
| Shore A | 49 | 44 | 40 | 33 |
| Tensile strength [MPa] | 5.8 | 4.7 | 1.8 | 0.5 |
| Elongation at break [%] | 950 | 1200 | 971 | 425 |
| Modulus of elasticity 5% [MPa] | 3.8 | 3.3 | 3.3 | 2.9 |
| PC adhesion | | | | |
| 7 d SCC | 100 | 100 | 100 | 100 |
| 7 d H$_2$O | 100 | 100 | 100 | 100 |
| 1 d 80° C. | 100 | 100 | 100 | 100 |
| 7 d 70° C./100% RH | 0 | 100 | 100 | 100 |
| ABS adhesion | | | | |
| 7 d SCC | 0 | 100 | 100 | 100 |
| 7 d H$_2$O | 0 | 100 | 100 | 100 |
| 1 d 80° C. | 0 | 100 | 100 | 100 |
| 7 d 70° C./100% RH | 0 | 100 | 100 | 100 |
| PVC adhesion | | | | |
| 7 d SCC | 0 | 100 | 100 | 90 |
| 7 d H$_2$O | 0 | 100 | 100 | 100 |
| 1 d 80° C. | 0 | 100 | 100 | 100 |
| 7 d 70° C./100% RH | 100 | 100 | 100 | 100 |

[1]p-toluenesulfonyl isocyanate
[2]Omyacarb ® 5 GU (from Omya).
[3]Aerosil ® R 972 (from Evonik)
[4]2,2'-dimorpholinodiethyl ether
[5]weight ratio between linear and branched polymer It is clear from tables 1 to 4 that the compositions of the invention in which the linear polymer and the branched polymer are present in the ratio of the invention show good mechanical properties and improved adhesion on the plastic substrates compared to the respective reference composition having too low a content of linear polymer (Z1/Z11/Z15), while reference compositions having too high a content of linear polymer (Z7/Z14/Z18) do show good adhesion but have such low tensile strength that they are unsuitable as adhesives for elastic bonds.

The invention claimed is:

1. A moisture-curing polyurethane composition comprising (i) at least one linear polymer P1 containing isocyanate groups and having an NCO content in the range from 0.3% to 3.3% by weight, obtained from the reaction of at least one monomeric aromatic diisocyanate and a polyether diol having an OH number in the range from 5 to 37 mg KOH/g, (ii) at least one branched polymer P2 containing isocyanate groups and having an NCO content in the range from 1% to 10% by weight, obtained from the reaction of at least one monomeric aromatic diisocyanate and at least one polyether triol having an average OH functionality in the region of at least 2.2 and an OH number in the range from 16 to 380 mg KOH/g, (iii) and a content of plasticizers of not more than 15% by weight, based on the overall composition, wherein polymer P1 and polymer P2 are present in a weight ratio in the range from 80/20 to 95/5.

2. The moisture-curing polyurethane composition as claimed in claim 1, wherein polymer P1 has an NCO content in the range from 0.5% to 2.6% by weight.

3. The moisture-curing polyurethane composition as claimed in claim 1, wherein polymer P1 is prepared in such a way that the NCO/OH ratio in the reaction is at least 4/1, and a majority of the monomeric aromatic diisocyanate is subsequently removed by means of a suitable separation process, such that the resultant polymer P1 containing isocyanate groups, after distillation, contains not more than 0.5% by weight of monomeric diisocyanate.

4. The moisture-curing polyurethane composition as claimed in claim 1, wherein the polyether diol has an OH number in the range from 6 to 33 mg KOH/g and an average OH functionality of at least 1.9.

5. The moisture-curing polyurethane composition as claimed in claim 1, wherein the monomeric aromatic diisocyanate for both polymers P1 and P2 is diphenylmethane 4,4'-diisocyanate.

6. The moisture-curing polyurethane composition as claimed in claim 1, wherein the content of the sum total of polymer P1 and polymer P2, based on the overall composition, is in the range from 20% to 80% by weight.

7. The moisture-curing polyurethane composition as claimed in claim 1, wherein the content of monomeric diisocyanates in the composition is less than 0.1% by weight in total.

8. The moisture-curing polyurethane composition as claimed in claim 1, wherein at least one further constituent selected from the group consisting of fillers, oligomeric diisocyanates, blocked amines, catalysts and stabilizers is present.

9. A method comprising a step of bonding, sealing, or coating at least one plastic substrate with the moisture-curing polyurethane composition of claim 1.

10. The method of claim 9, wherein the plastic substrate is selected from the group consisting of rigid PVC, flexible PVC, polycarbonate, polystyrene, polyester, polyamide, PMMA, ABS, SAN, epoxy resins, phenolic resins, PUR, POM, TPO, PE, PP, EPM, EPDM, and blends of polycarbonate with further plastics.

11. A method of bonding or sealing, comprising the steps of
(i) applying the moisture-curing polyurethane composition as claimed in claim 1
to a first substrate and contacting the composition with a second substrate within the open time of the composition, or
to a first and to a second substrate and joining the two substrates within the open time of the composition, or
between two substrates, and
(ii) curing the composition by contact with moisture.

12. A method of coating or sealing, comprising the steps of
(i) applying the moisture-curing polyurethane composition as claimed in claim 1 to a substrate, and
(ii) curing the composition by contact with moisture.

13. A cured composition obtained from the moisture-curing polyurethane composition as claimed in claim 1 after contact thereof with moisture.

14. A bonded composite comprising at least one plastic substrate and the polyurethane composition as claimed in claim 1 that has been cured by contact with moisture.

* * * * *